(12) United States Patent
Lee

(10) Patent No.: US 10,680,218 B2
(45) Date of Patent: Jun. 9, 2020

(54) BATTERY FOLD STRUCTURE OF ELECTRONIC DEVICE

(71) Applicant: Getac Technology Corporation, Hsinchu County (TW)

(72) Inventor: Kun-Cheng Lee, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 132 days.

(21) Appl. No.: 16/158,573

(22) Filed: Oct. 12, 2018

(65) Prior Publication Data

US 2020/0119319 A1 Apr. 16, 2020

(51) Int. Cl.
*H01M 2/10* (2006.01)
*H01M 10/42* (2006.01)

(52) U.S. Cl.
CPC ....... *H01M 2/1077* (2013.01); *H01M 10/425* (2013.01)

(58) Field of Classification Search
CPC .......................... H01M 2/1077; H01M 10/425
USPC .......................................................... 429/99
See application file for complete search history.

(56) References Cited

U.S. PATENT DOCUMENTS

2018/0108891 A1* 4/2018 Fees ..................... B60L 50/66

* cited by examiner

*Primary Examiner* — Gary D Harris
(74) *Attorney, Agent, or Firm* — Locke Lord LLP; Tim Tingkang Xia, Esq.

(57) ABSTRACT

A battery fold structure of an electronic device includes a device proper and at least one battery. The device proper has battery compartments and movable structures corresponding in position thereto, respectively. Each movable structure is movable relative to the device proper. At least one blocker is fixedly disposed at each movable structure. At least one bidirectional blocking element is fixedly disposed on the battery. The bidirectional blocking element has a first blocking portion and a second blocking portion. When the battery is received in one of the battery compartments, the first blocking portion of the bidirectional blocking element fixedly disposed on the battery is blocked by the blockers. When the battery is received in the other battery compartment, the second blocking portion of the bidirectional blocking element fixedly disposed on the battery is blocked by the blockers. Two batteries are mounted inside two battery compartments interchangeably and unlocked simultaneously.

10 Claims, 7 Drawing Sheets

BATTERY FOLD STRUCTURE OF ELECTRONIC DEVICE

BACKGROUND OF THE INVENTION

Field of the Invention

The present disclosure relates to battery start structures and, more particularly, to a battery fold structure of an electronic device.

Description of the Prior Art

Electronic devices come with batteries in order to be portable. Nowadays, electronic devices are becoming more robust and thus more power-consuming. To enhance its endurance, every conventional electronic device requires two batteries to be its standard equipment requirement.

However, the battery start structure of every conventional electronic device requires a user to operate it from the same surface of the electronic device in the same direction, that is, not ergonomically (because the two human hands face each other while working in a cooperative manner.) As a result, no user can, on one's intuitions, unlock the two batteries of the electronic device simultaneously.

Therefore, it is imperative to provide a battery fold structure of an electronic device and thereby overcome the aforesaid drawback of the prior art.

SUMMARY OF THE INVENTION

It is an objective of the present disclosure to provide a battery fold structure of an electronic device.

In order to achieve the above and other objectives, the present disclosure provides a battery fold structure of an electronic device, comprising: a device proper having a plurality of battery compartments and a plurality of movable structures corresponding in position to the battery compartments, respectively, the movable structures each being movable relative to the device proper, with at least one blocker fixedly disposed at each said movable structure; and at least one battery, wherein at least one bidirectional blocking element is not only fixedly disposed at the battery but also has a first blocking portion and a second blocking portion; wherein, the first blocking portion of the at least one bidirectional blocking element fixedly disposed at the battery is blocked by the at least one blocker when the battery is received selectively in one of the battery compartments, and the second blocking portion of the at least one bidirectional blocking element fixedly disposed at the battery is blocked by the at least one blocker when the battery is received selectively in the other battery compartment.

Compared with the prior art, the present disclosure has advantages as follows: a user can unlock two batteries simultaneously on the same surface or the same side of the same electronic device intuitively and easily; any one of the batteries can be mounted inside any one of the battery compartments.

DETAILED DESCRIPTION OF THE EMBODIMENTS

Figure 1:
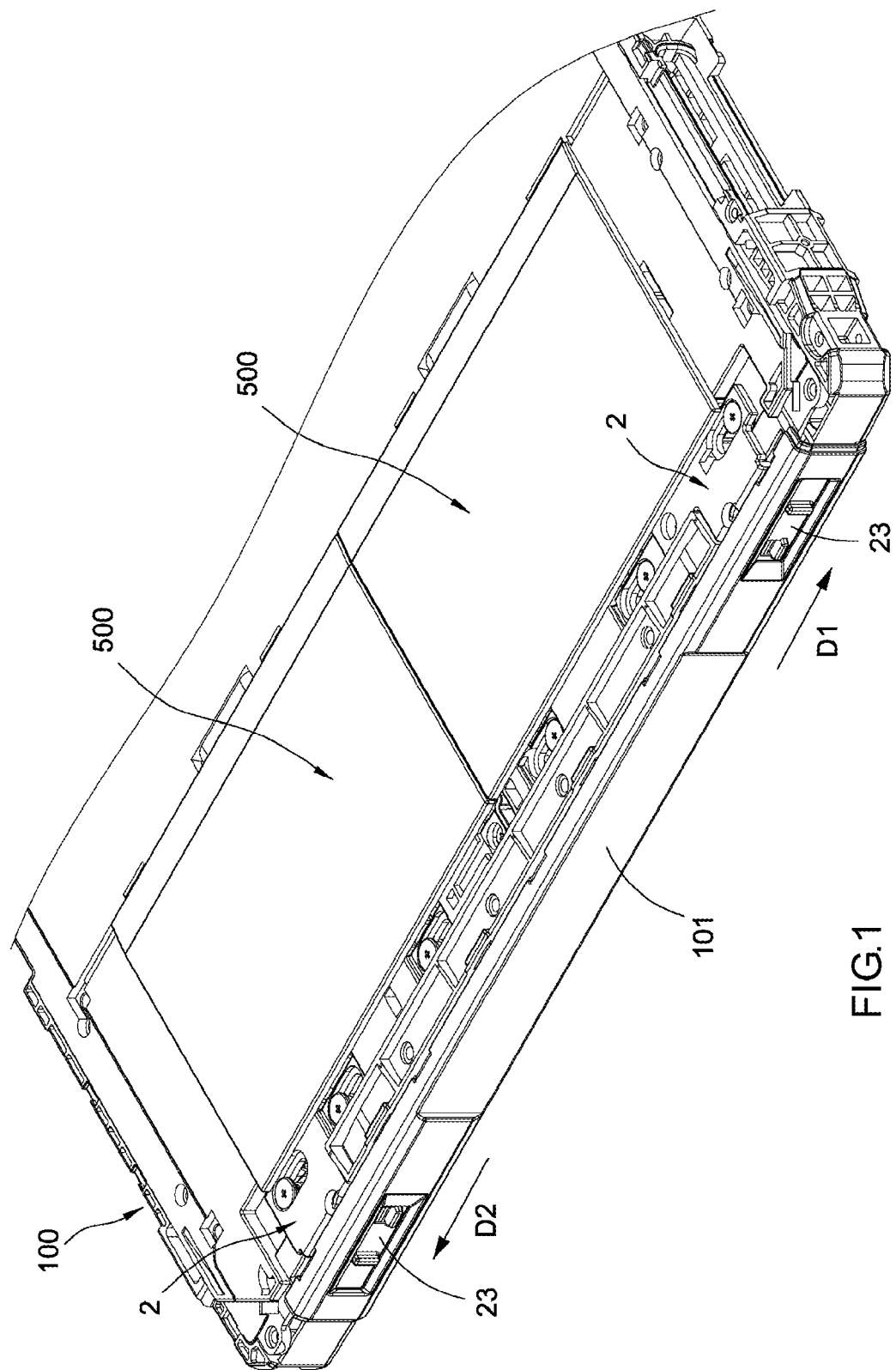
FIG. 1 is a perspective view of a battery fold structure of an electronic device according to the present disclosure.
Figure 2:
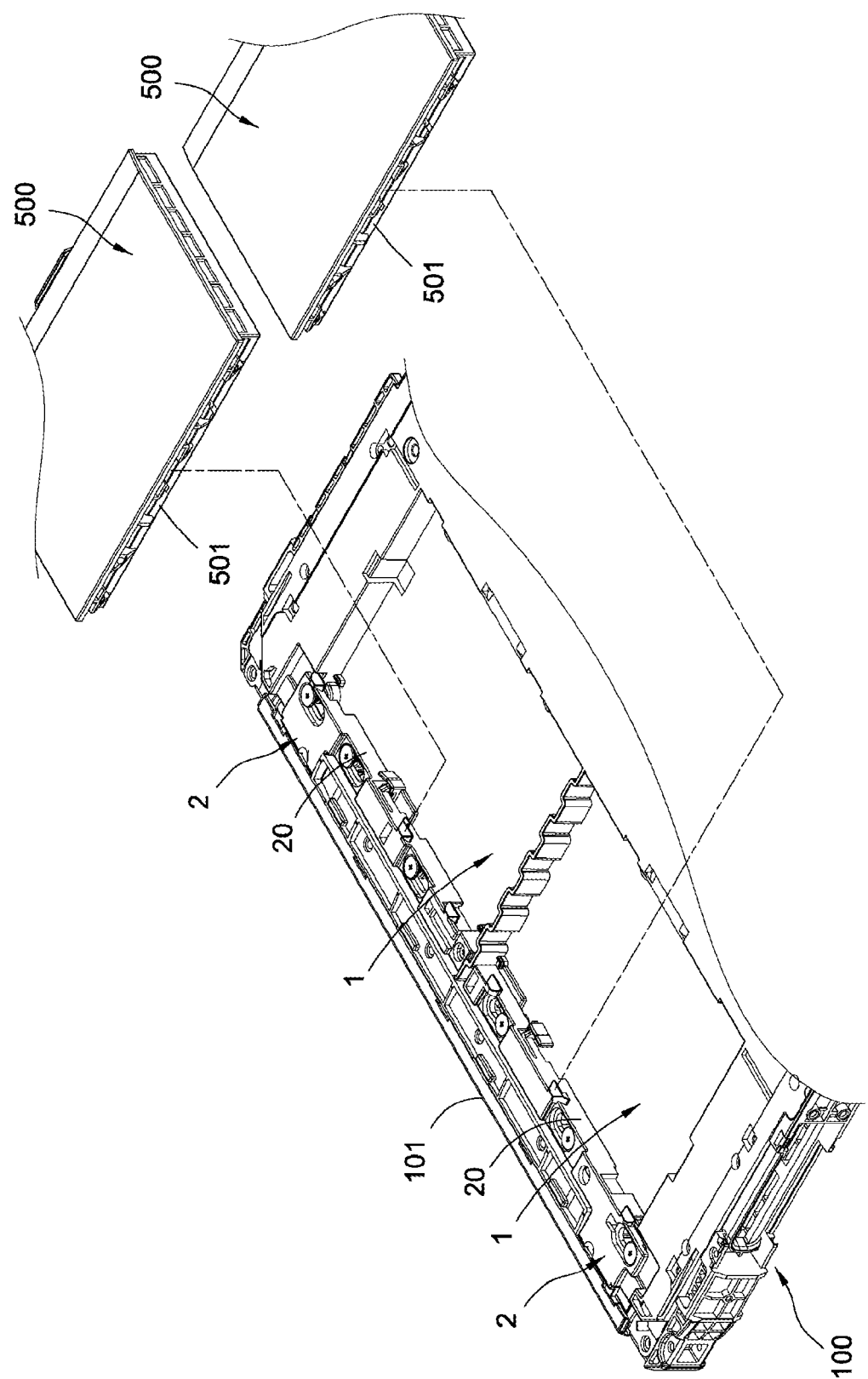
FIG. 2 is an exploded view of the battery fold structure before batteries are mounted according to the present disclosure.

Details and technical features of the present disclosure are depicted by accompanying drawings and described below. However, the accompanying drawings only serve as a reference source and serve explanatory purposes, but are not intended to limit the present disclosure.

Referring to FIG. 1 through FIG. 5, the present disclosure provides a battery fold structure of an electronic device to allow a user to push, in a two-handed, bidirectional manner, two batteries 500 on the same electronic device so as to unmount the batteries 500. The electronic device is a screen-equipped upper component (as shown) of a laptop, a keyboard-equipped lower component (not shown) of a laptop, or a tablet (not shown). According to an embodiment of the present disclosure, the battery fold structure of an electronic device comprises a device proper 100 of an electronic device and at least one battery 500 mountably/unmountably received in or engaged with the device proper 100.

A plurality of battery compartments 1 and a plurality of movable structures 2 are disposed on a surface (for example, an outer surface of the upper component) of the device proper 100. The battery compartments 1 are in the number of two or a multiple of two. The movable structures 2 are in the number of two or a multiple of two. This embodiment is exemplified by two battery compartments 1 and two movable structures 2. The movable structures 2 correspond in position to the battery compartments 1, respectively, and are slidably disposed on the device proper 100; hence, each movable structure 2 can move relative to the device proper 100. An elastomer 24 (shown in FIG. 3) is connected between each movable structure 2 and a corresponding one of the battery compartments 1 to allow the movable structure 2 to return to an initial position thereof under a resilient restoring force provided by the elastomer 24.

Referring to FIG. 1, the device proper 100 has a plurality of thickness sides. The thickness sides include an upper side (not shown), a lower side 101 opposing the upper side, and two opposing sides (not denoted with any reference numeral). The lower side 101 is a pivotal connection side whereby the upper component is pivotally connected to the lower component directly or indirectly. Preferably, the movable structures 2, corresponding in position to the lower side 101, are arranged side by side and disposed on the device proper 100 in such a manner to allow the movable structures 2 to be not only substantially parallel to the lower side 101 in the lengthwise direction but also located at two points on the device proper 100, respectively. When pushed by the user, the movable structures 2 move relative to the device proper 100 in a first movable direction D1 and an opposing second movable direction D2, respectively, for example, toward each other (not shown) or away from each other (as shown in FIG. 1). Both the first movable direction D1 and the second movable direction D2 are substantially parallel to the lower side 101.

Figure 3:
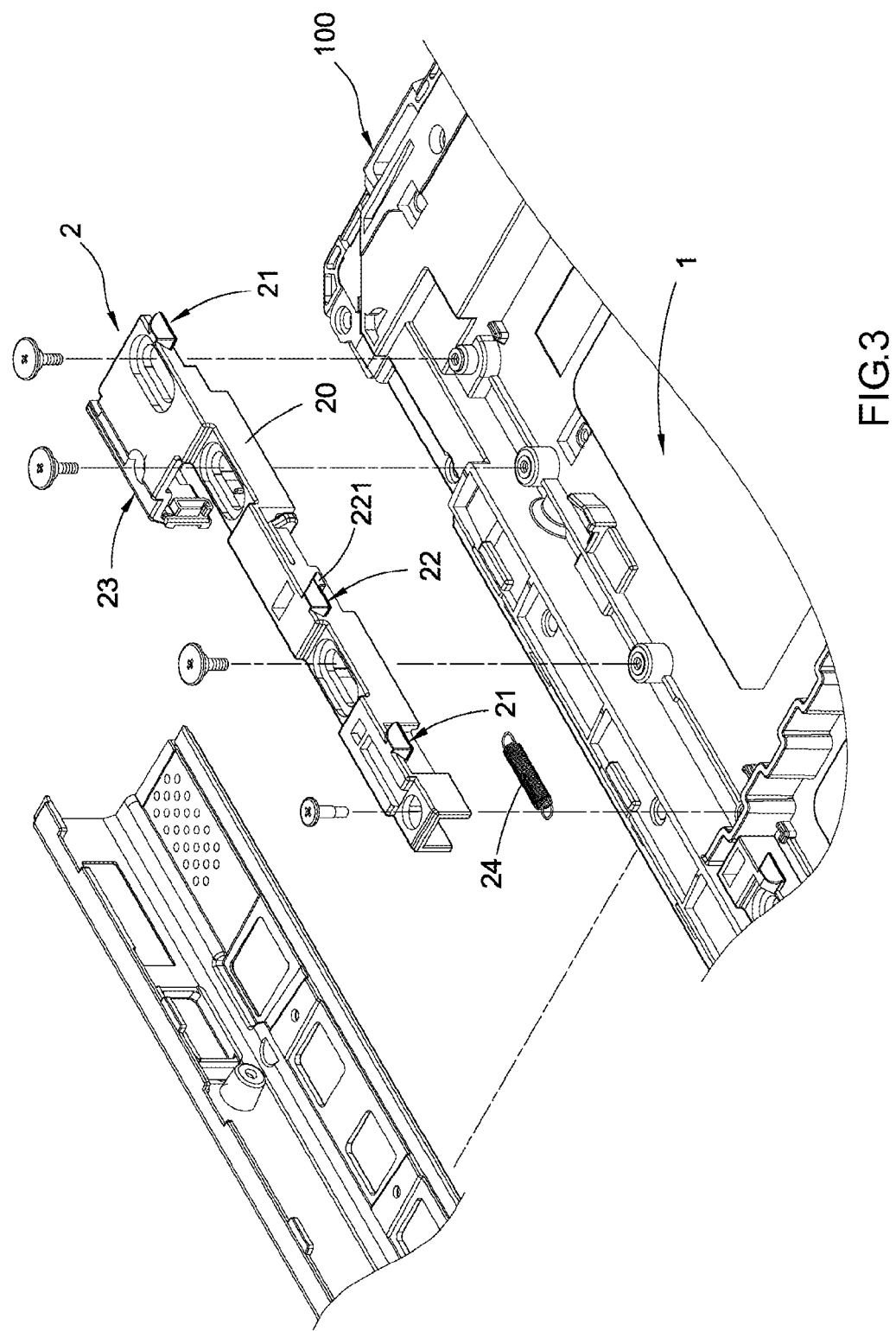
FIG. 3 is an exploded view of a movable structures of the battery fold structure according to the present disclosure.

At least one blocker is fixedly disposed on one side 20 of each movable structure 2. A push lever 23 is disposed on the other side (not denoted with any reference numeral) opposite the one side 20. The push lever 23 is exposed from the lower side 101 and thus can be easily pushed by the user. The blockers are in the number of one, two or more, but the present disclosure is not limited thereto (as long as the blockers can block the batteries 500.) This embodiment is exemplified by three blockers, such as three first blockers 21. Referring to FIG. 3, the three blockers include two first blockers 21 and a second blocker 22 disposed between the two first blockers 21.

The batteries 500 are in the number of one, two or more. This embodiment is exemplified by two batteries 500, and the two batteries 500 are identical; hence, any one of the two batteries 500 can be mounted inside any one of the battery compartments 1. Therefore, each embodiment of the present disclosure described below is exemplified by one said battery 500.

Figure 4:
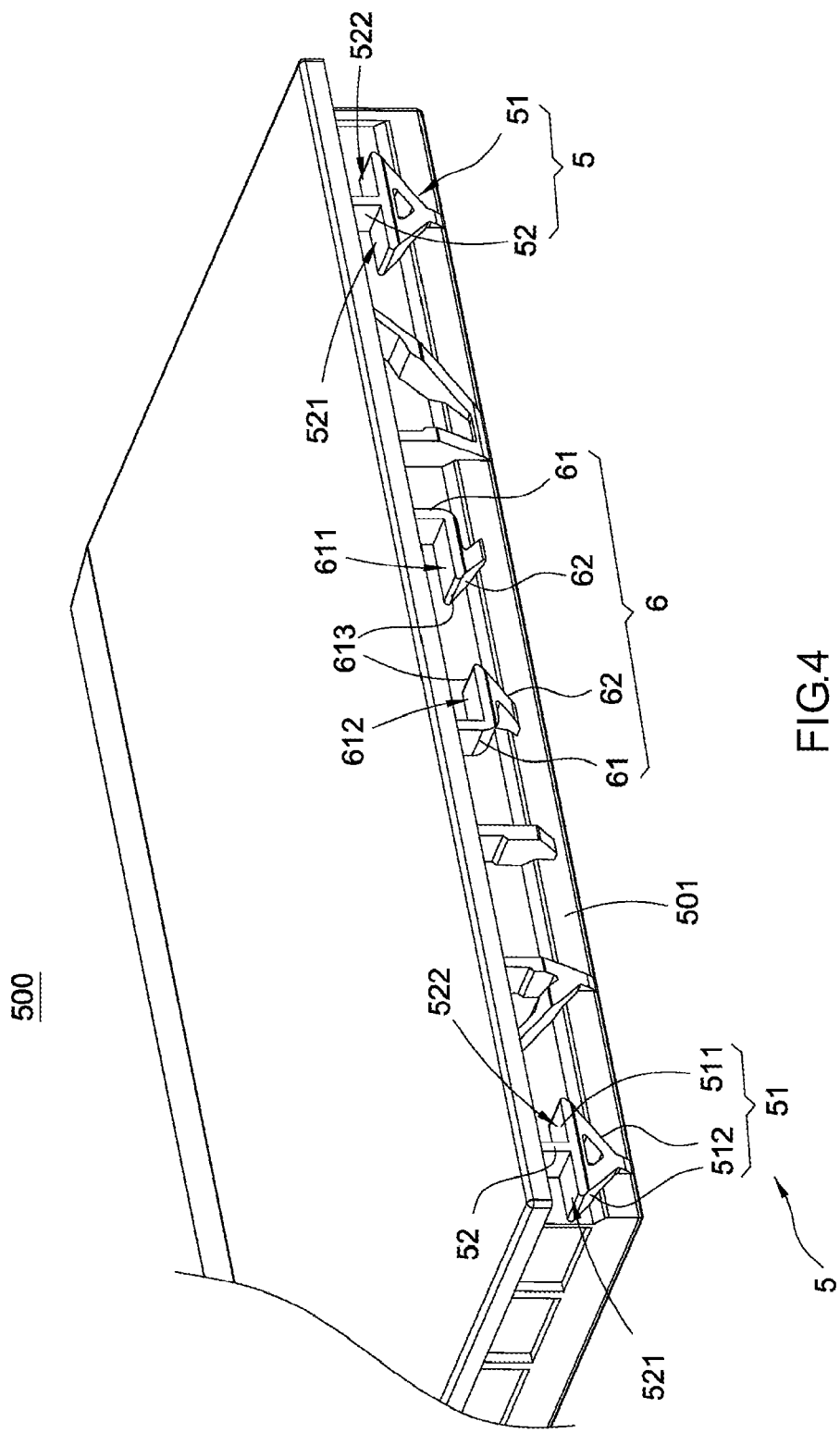
FIG. 4 is a partial perspective view of a battery in the battery fold structure according to the present disclosure.

The battery 500 has a plurality of sides. The sides include an adjoining side 501 which adjoins the one side 20. At least one bidirectional blocking element is fixedly disposed on the adjoining side 501 of the battery 500. The bidirectional blocking element has two blocking portions which contain the blockers and thus are blocked. The bidirectional blocking element is in the number of one, two or more, but the present disclosure is not limited thereto (as long as the bidirectional blocking element can be blocked by any one of the movable structures 2.) This embodiment is exemplified by three bidirectional blocking elements corresponding in position to the three blockers, such as three first bidirectional blocking elements 5. Referring to FIG. 4, the three bidirectional blocking elements include two first bidirectional blocking elements 5 and a second bidirectional blocking element 6 disposed between the two first bidirectional blocking elements 5.

The first bidirectional blocking elements 5 each comprise a blocking body 51 and a partition board 52 uprightly disposed on the blocking body 51. A first blocking portion 521 and a second blocking portion 522 are formed between the blocking body 51 and two opposing sides of the partition board 52, respectively. The blocking body 51 has a top side 511 and two guide slopes 512. The partition board 52 is uprightly disposed between two ends of the top side 511. The two guide slopes 512 extend from the two ends of the top side 511, respectively, in the direction away from the partition board 52 to approach each other and thus facilitate guidance of the blockers.

The second bidirectional blocking element 6 comprises two blocking boards 61 symmetric to each other and two guiding oblique boards 62 symmetric to each other. The two blocking boards 61 are separated from each other and have their respective open corners in communication with each other to therefore form a first blocking portion 611 and a second blocking portion 612, respectively. The two blocking boards 61 further have two adjacent inner ends 613 which are separate but adjacent. The two guiding oblique boards 62 are connected to the two adjacent inner ends 613, respectively, and separated from each other gradually in the direction away from the two blocking boards 61 to therefore facilitate guidance of the blockers.

Figure 5:
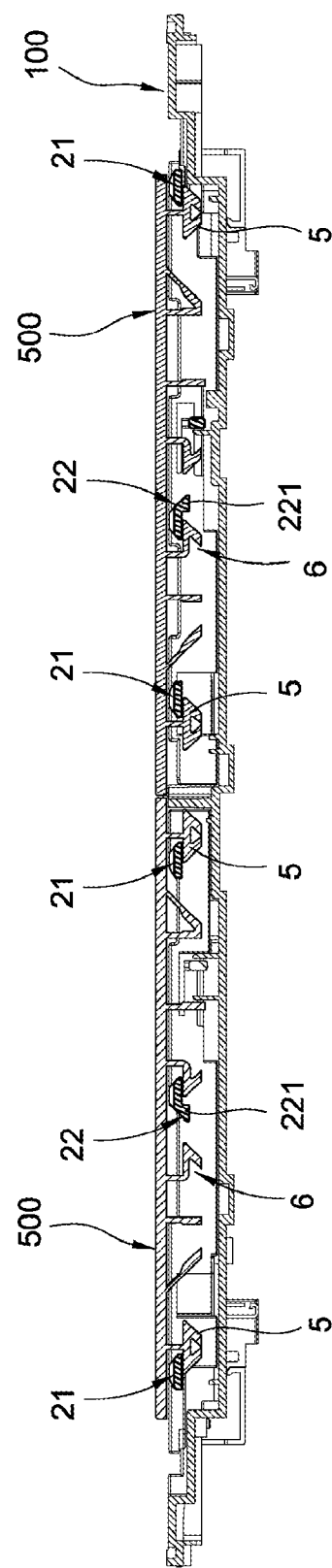
FIG. 5 is a cross-sectional view of the battery fold structure before being moved according to the present disclosure.
Figure 6:
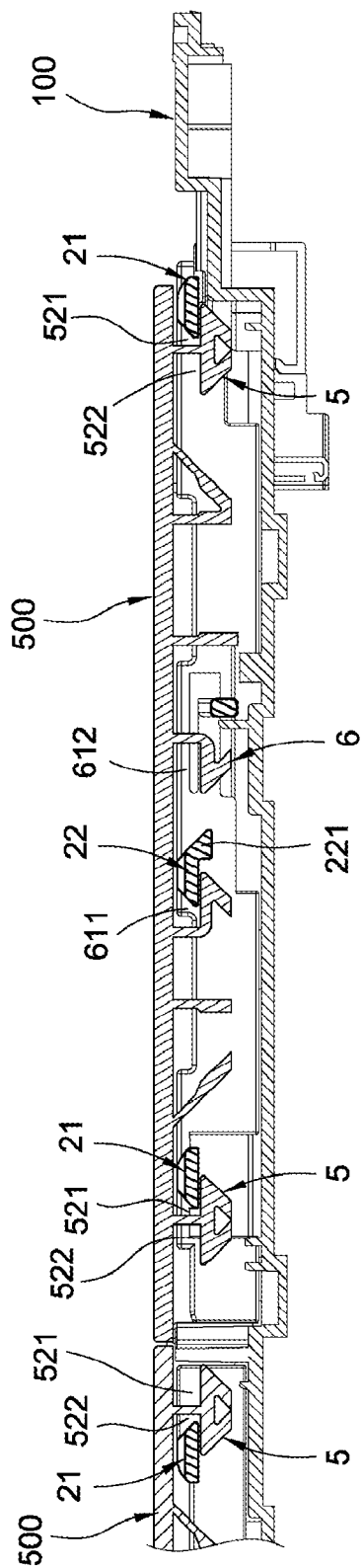
FIG. 6 is a partial enlarged view of FIG. 5 according to the present disclosure.

Referring to FIG. 5, FIG. 6 and FIG. 1, when any one of the batteries 500 is mounted inside the first one of the battery compartments 1 selectively, the blockers 21, 22 of the first one of the movable structures 2 are inserted into the first blocking portions 521, 611 of the battery 500 and thus blocked. Similarly, when the battery 500 is mounted inside the second one of the battery compartments 1 selectively, the blockers 21, 22 of the second one of the movable structures 2 are inserted into the second blocking portions 522, 612 of the battery 500 and thus blocked.

Specifically speaking, when the two batteries 500 are mounted inside the two battery compartments 1, respectively, not only are the two first blockers 21 of the first one of the movable structures 2 inserted into the first blocking portions 521 of the two first bidirectional blocking elements 5 of the first one of the batteries 500 and thus blocked, respectively, but the second blocker 22 of the first one of the movable structures 2 is also inserted into the first blocking portion 611 of the second bidirectional blocking element 5 of the first one of the batteries 500 and thus blocked such that the first one of the movable structures 2 locks the first one of the batteries 500. Similarly, when the two batteries 500 are mounted inside the two battery compartments 1, respectively, not only are the two first blockers 21 of the second one of the movable structures 2 inserted into the second blocking portions 522 of the two first bidirectional blocking elements 5 of the second one of batteries 500 and thus blocked, respectively, but the second blocker 22 of the second one of the movable structures 2 is also inserted into the second blocking portion 612 of the second bidirectional blocking element 5 of the second one of the batteries 500 and thus blocked such that the second one of the movable structures 2 locks the second one of the batteries 500.

Figure 7:
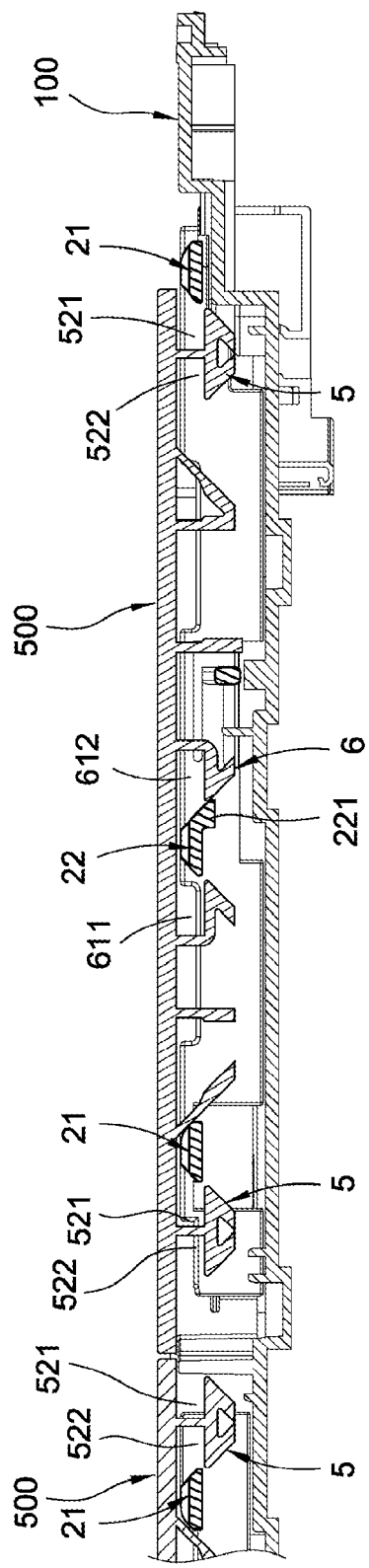
FIG. 7 is a cross-sectional view of the battery fold structure after being moved according to the present disclosure.

Referring to FIG. 7, FIG. 3 and FIG. 4, to unlock the two mounted batteries 500 simultaneously, the user gropes for the lower side 101 and the two movable structures 2 so as to move intuitively the two movable structures 2 in the first movable direction D1 and the second movable direction D2, respectively.

Specifically speaking, when the user moves simultaneously the two movable structures 2 with two hands in the two directions D1, D2, respectively, the blockers 21, 22 of the first one of the movable structures 2 exit the first blocking portions 521, 611 of the first one of the batteries 500, respectively, and thus are no longer blocked, and in consequence the first one of the batteries 500 is unlocked. Similarly, when the user moves simultaneously the two movable structures 2 with two hands in the two directions D1, D2, respectively, the blockers 21, 22 of the second one of the movable structures 2 exit the second blocking portions 522, 612 of the second one of the batteries 500, respectively, and thus are no longer blocked, and in consequence the second one of the batteries 500 is unlocked. Therefore, the user can unlock the two batteries 500 easily and intuitively by bidirectional folding.

A purpose of the two guiding oblique boards 62 and the two guide slopes 512 of the battery 500 is to guide the first blockers 21 and the second blocker 22, respectively, while pressing down the battery 500 and mounting the battery 500 inside the battery compartment 1, so as to move the two movable structures 2. Another purpose of the two guiding oblique boards 62 and the two guide slopes 512 of the battery 500 is to allow, whenever the battery 500 is unlocked, the first blockers 21 and the second blocker 22 to push the two guide slopes 512 and the two guiding oblique boards 62, respectively, and thus jut the battery 500 out of the battery compartment 1 partially, thereby rendering it easy for the user to take the battery 500.

Referring to FIG. 6 and FIG. 7, a protrusion portion 221 corresponding in position to the adjacent inner ends 613 is disposed at one end of the second blocker 22 of each movable structure 2 such that the protrusion portion 221 is blocked by the adjacent inner ends 613, so as to prevent the second blocker 22 from entering a wrong one of the blocking portions 611, 612.

Referring to FIG. 5, regarding the battery fold structure of the present disclosure, since the movable structures 2 may have some functional structures, for example, a structure for detecting whether a battery is mounted or unmounted, the blockers 21, 22 on the two movable structures 2 have to circumvent these functional structures and thus cannot be fully symmetric to each other. In this regard, although the blockers 21, 22 on the two movable structures 2 cannot be fully symmetric to each other, the battery fold structure of the present disclosure not only achieves the aforesaid objectives thereof but also achieves the aforesaid advantages.

In another embodiment not shown, the movable structures 2 dispense with these functional structures, and thus the blockers 21, 22 on the movable structures 2 can be symmetric to each other, thereby cutting costs.

In yet another embodiment not shown, the blockers on the movable structures 2 are in the number of one, the at least one bidirectional blocking element on the battery 500 is also in the number of one (although the blocker and the bidirectional blocking element are each in the number of one, the blocker and the bidirectional blocking element are sufficient to lock and unlock the battery 500.) Only the first blockers 21 are fixedly disposed at any point on the one side 20 of each movable structure 2. Only the first bidirectional blocking element 5 is fixedly disposed at a corresponding point on the adjoining side 501 of the battery 500. Since the electronic device can operate without just one battery 500, the battery 500 can also be in the number of one. Therefore, the battery 500 can be mounted inside any one of the battery compartments 1. When the battery 500 is mounted inside the first one of the battery compartments 1, the first blocking portion 521 of the first bidirectional blocking element 5 of the battery 500 is blocked by the first blockers 21 of the first one of the movable structures 2. When the battery 500 is mounted inside the second one of the battery compartments 1, the second blocking portion 522 of the first bidirectional blocking element 5 of the battery 500 is blocked by the first blockers 21 of the second one of the movable structures 2.

When compared with the prior art, the present disclosure has the following advantages: special battery fold structure design allows a user to unlock two batteries 500 simultaneously on the same surface or the same side (lower side 101) of the same electronic device and thus is ergonomic, thereby allowing the user to unlock the battery 500 intuitively and easily; any one of the batteries 500 can be mounted inside any one of the battery compartments 1 to not only bring no inconvenience to the user but also allow the two batteries 500 to be identical and thus render it feasible to open just one die.

The present disclosure also has the following advantages: given the lower side 101 of the device proper 100, that is, a pivotal connection side whereby the upper component is pivotally connected to the lower component directly or indirectly; therefore, although the push levers 23 of the two movable structures 2 are exposed from the lower side 101, the operation of a laptop requires the upper component to be opened and thus causes the lower side 101 to face downward and thus be hidden; a laptop not in use requires the upper component to be shut and then causes the lower side 101 to face the rear side of the electronic device and thus be hidden; therefore, the electronic device is aesthetically pleasing.

The present disclosure is disclosed above by preferred embodiments, but the claimed scope of the present disclosure is not limited thereto. Equivalent structural changes made to the preferred embodiments in accordance with the disclosure contained in the specification and drawings of the present disclosure shall fall within the claimed scope of the present disclosure.

What is claimed is:

1. A battery fold structure of an electronic device, comprising:
   a device proper having a plurality of battery compartments and a plurality of movable structures corresponding in position to the battery compartments, respectively, the movable structures each being movable relative to the device proper, with at least one blocker fixedly disposed at each said movable structure; and
   at least one battery, wherein at least one bidirectional blocking element is not only fixedly disposed at the battery but also has a first blocking portion and a second blocking portion;
   wherein, the first blocking portion of the at least one bidirectional blocking element fixedly disposed at the battery is blocked by the at least one blocker when the battery is received selectively in one of the battery compartments, and the second blocking portion of the at least one bidirectional blocking element fixedly disposed at the battery is blocked by the at least one blocker when the battery is received selectively in the other battery compartment.

2. The battery fold structure of an electronic device according to claim 1, wherein the movable structures move relative to the device proper in a first movable direction and a second movable direction opposing the first movable direction, respectively.

3. The battery fold structure of an electronic device according to claim 1, wherein the device proper has a lower side such that the movable structures, corresponding in position to the lower side, are arranged side by side and disposed on the device proper, the movable structures each having a push lever, the push levers being exposed from the lower side and thus movable.

4. The battery fold structure of an electronic device according to claim 1, wherein the battery is in the number of two, and the two batteries have identical said at least one bidirectional blocking element.

5. The battery fold structure of an electronic device according to claim 1, wherein the bidirectional blocking element comprises a blocking body and a partition board uprightly disposed on the blocking body such that the first blocking portion and the second blocking portion are formed between the blocking body and two opposing sides of the partition board, respectively.

6. The battery fold structure of an electronic device according to claim 5, wherein the blocking body has a top side and two guide slopes, with the partition board uprightly disposed between two ends of the top side, the two guide slopes extending from the two ends of the top side, respectively, in a direction away from the partition board to approach each other.

7. The battery fold structure of an electronic device according to claim 1, wherein the bidirectional blocking element is in the number of three and comprises two first bidirectional blocking elements and a second bidirectional blocking element disposed between the two first bidirectional blocking elements, the first bidirectional blocking elements each comprising a blocking body and a partition board uprightly disposed on the blocking body, such that the first blocking portion and the second blocking portion are formed between the blocking body and two opposing sides of the partition board, respectively, with the blocking body having two guide slopes.

8. The battery fold structure of an electronic device according to claim 7, wherein the second bidirectional blocking element comprises two blocking boards symmetric to each other and two guiding oblique boards symmetric to each other, the two blocking boards being separated from each other and having respective open corners in communication with each other to therefore form the first blocking portion and the second blocking portion, respectively, and the two guiding oblique boards are connected to two adjacent inner ends of the two blocking boards, respectively, and separated from each other gradually in a direction away from the two blocking boards.

9. The battery fold structure of an electronic device according to claim 1, wherein the blockers of the plurality of movable structures are symmetric to each other.

10. The battery fold structure of an electronic device according to claim 9, wherein the blockers of the movable structures are in the number of three and include two first blockers and a second blocker disposed between the two first blockers, and a protrusion portion is disposed at each of two opposing ends of the second blocker of each said movable structure.

* * * * *